United States Patent [19]

Hsieh

[11] Patent Number: 4,507,713
[45] Date of Patent: Mar. 26, 1985

[54] WIDE FREQUENCY MULTI-PHASE UNDERVOLTAGE DETECTION CIRCUIT

[75] Inventor: Samuel C. Hsieh, Eatontown, N.J.

[73] Assignee: Allied Corporation, Morris Township, Morris County, N.J.

[21] Appl. No.: 540,593

[22] Filed: Oct. 11, 1983

[51] Int. Cl.³ .............................................. H02H 3/24
[52] U.S. Cl. ....................................... 361/92; 361/90; 340/663
[58] Field of Search ......................... 361/92, 90, 76, 77, 361/86, 87; 340/663, 661, 660; 307/127

[56] References Cited

U.S. PATENT DOCUMENTS

| | | | |
|---|---|---|---|
| 3,401,308 | 9/1968 | Darke | 361/76 |
| 3,611,162 | 10/1971 | Tochitani | 361/90 X |
| 3,636,541 | 1/1972 | Genuit et al. | 340/663 X |
| 3,716,718 | 2/1973 | Nowell | 361/76 |

Primary Examiner—Patrick R. Salce
Attorney, Agent, or Firm—Howard G. Massung; Stanley N. Protigal

[57] ABSTRACT

A multi-phase undervoltage detection circuit is disclosed wherein a multi-phase input voltage is compared to a reference. If the peak level of the input voltage is above the reference, a capacitor is discharged. If the voltage of any one of the phases is below the reference, the capacitor charges above the level of the input to a flip-flop. At the same time the voltage of another of the phases clocks the flip-flop. Since the input of the flip-flop is "high" when it is clocked, it changes states and its output goes "low" which provides a circuit output indicative of an undervoltage condition. If no undervoltage condition exists, the flip-flop will not change states and the circuit output is indicative of a non-undervoltage condition.

4 Claims, 1 Drawing Figure

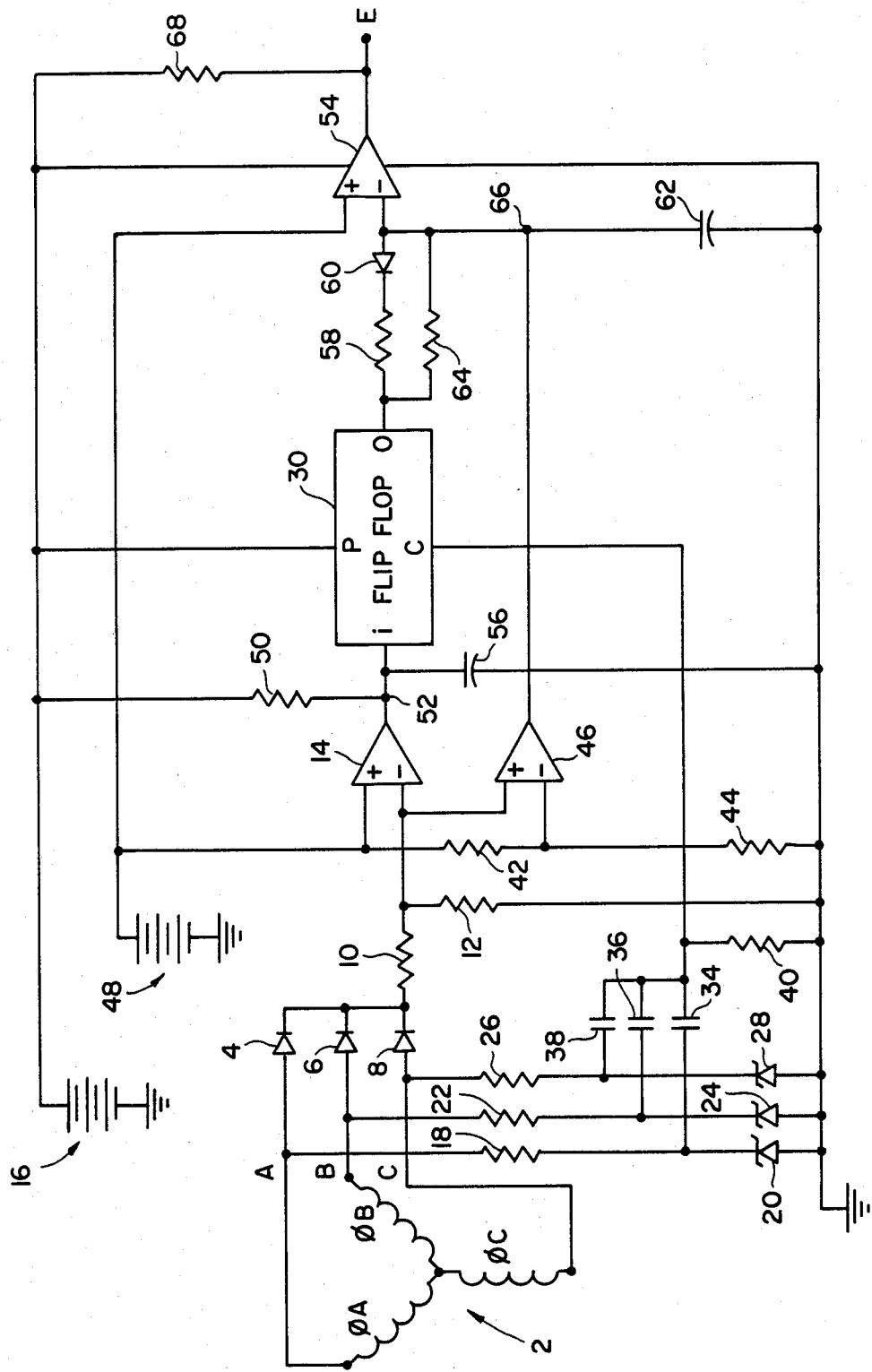

WIDE FREQUENCY MULTI-PHASE UNDERVOLTAGE DETECTION CIRCUIT

BACKGROUND OF THE INVENTION

Multi-phase electrical equipment such as generator control units, bus power control units, converters, generators and like equipment require undervoltage detection circuits for detecting when the output voltage of a particular phase is below a predetermined set point. Since equipment of the type described operates over a wide frequency range, the undervoltage detection circuit must operate independent of frequency. Additionally, when the equipment is used on aircraft, accuracy and simplicity are distinct advantages.

Prior to the present invention, such undervoltage detection circuits have been designed using an array of discrete components or several integrated circuits. Operationally these circuits have used capacitors to hold a rectified multi-phase output and to compare the voltage level of a particular phase to a preset reference. Circuits of this type, while accurate, have relatively poor temperature stability, which precludes their use in many applications. Other prior art circuits utilize an RMS to DC integrated chip for each of the phases for converting the individual phases from a sinusoidal signal to a DC signal, and comparing the DC signal to a preset reference. Circuits of this type are relatively expensive to implement.

Accordingly, it is the object of the present invention to provide a multi-phase undervoltage detection circuit which operates accurately over a wide frequency range and has the advantages of accuracy, simplicity and low implementation costs.

SUMMARY OF THE INVENTION

This invention contemplates a multi-phase undervoltage detection circuit wherein each of the multi-phase voltages are rectified and a comparator compares the peak level of the rectified voltages to a preset reference level. If the peak level is above the preset reference level, the comparator is effective for discharging a capacitor. If the voltage level of any of the phases is below the preset reference level, the capacitor charges to a level above the threshold of the input to a switching device such as a flip-flop. Simultaneously another phase voltage clocks the flip-flop. Since the input to the flip-flop is "high" when the flip-flop is clocked, the output of the flip-flop goes "low" to discharge another capacitor. If a continuous undervoltage exists, the output of the flip-flop remains "low". Another comparator compares the discharged output of the capacitor to the reference level and provides a "high" output indicative of the undervoltage. If no undervoltage exists, the input to the flip-flop will not exceed its threshold, and when the flip-flop is clocked, it retains its status—i.e., the flip-flop output is "high" and is effective for charging the other capacitor. The output of the other comparator thereupon remains "low," which is indicative of a non-undervoltage condition.

BRIEF DESCRIPTION OF THE DRAWING

The single FIGURE in the drawing is a circuit diagram of an undervoltage detection circuit according to the invention.

DETAILED DESCRIPTION OF THE INVENTION

Multi-phase A.C. equipment is designated by the numeral 2 and provides, for example, a three-phase voltage output, with the phases designated as $\phi_A$, $\phi_B$, and $\phi_C$, at output conductors A, B, and C, respectively. Output conductors A, B, and C are connected to rectifying diodes 4, 6, and 8, respectively. The outputs of the diodes are applied through a voltage divider including a resistor 10 and a grounded resistor 12, to the inverting input (−) of a conventional comparator amplifier 14.

A suitable DC reference voltage provided by a battery 16 is applied to the non-inverting input (+) of comparator amplifier 14.

Output conductor A is connected to ground through a resistor 18 and a zener diode 20, output conductor B is connected to ground through a resistor 22 and a zener diode 24, and output conductor C is connected to ground through a resistor 26 and a zener diode 28.

The output of comparator amplifier 14 is connected to the input terminal (i) of a switching device such as a conventional flip-flop 30. A capacitor 34 is connected between resistor 18 and zener diode 20 and is connected to the clock terminal (c) of flip-flop 30. A capacitor 36 is connected between resistor 22 and zener diode 24 and between capacitor 34 and clock terminal (c) of flip-flop 30. A capacitor 38 is connected between resistor 26 and zener diode 28 and between capacitor 34 and flip-flop clock terminal (c). A resistor 40 is connected between capacitor 34 and flip-flop clock terminal (c) and is connected to ground.

A voltage divider including a resistor 42 and a grounded resistor 44 is connected to battery 16. The inverting input terminal (−) of a conventional comparator amplifier 46 is connected between resistors 42 and 44. The non-inverting input terminal (+) of comparator amplifier 46 is connected between resistor 10 and inverting input terminal (−) of comparator amplifier 14.

A power source such as a battery 48 is connected through a resistor 50 to a circuit point 52 between the output of comparator amplifier 14 and input terminal (i) of flip-flop 30. Battery 48 is connected to a power terminal P of flip-flop 30 and is connected to a comparator amplifier 54. Battery 48 is connected through a resistor 68 to the output of comparator amplifier 54.

A capacitor 56 is connected between circuit point 52 and input terminal (i) of flip-flop 30 and is connected to ground. An output terminal (o) of flip-flop 30 is connected through a resistor 58 and a diode 60 serially connected thereto the inverting input terminal (−) of comparator amplifier 54. Battery 16 is connected to the non-inverting input terminal (+) of comparator amplifier 54.

A capacitor 62 is connected between diode 60 and the inverting input terminal (−) of comparator amplifier 54 and is connected to ground. A resistor 64 is connected to the output terminal (o) of flip-flop 30 and is connected to capacitor 62. The output of comparator amplifier 46 is connected to a circuit point 66 between resistor 64 and capacitor 62. Comparator amplifier 54 provides an output $E_o$, which is indicative of an undervoltage or a non-undervoltage condition existing in the three-phase input from electrical equipment 2, as the case may be.

OPERATION OF THE INVENTION

The output voltages of phases $\phi_A$, $\phi_B$, and $\phi_C$ provided at output conductors A, B, and C of electrical equipment 2 are rectified by diodes 4, 6, and 8, respectively, and are applied as an input to comparator amplifier 14. The peak level of the input is compared by comparator 14 to a preset reference provided by battery 16. If the peak level after the voltage divider including resistors 10 and 12 is above the preset reference, comparator amplifier 14 is rendered "on" and discharges capacitor 56. The time constant of resistor 50 and capacitor 56 is set for a slow recharge of the capacitor.

If any of the voltages at conductors A, B, and C are under the preset reference provided by battery 16, comparator amplifier 14 is in an "off" state. Capacitor 56 will charge to a level above the threshold of the input to flip-flop 30.

At the same time, a pulse from another of the voltages at conductors A, B, and C is coupled through capacitors 34, 36 or 38, as the case may be, as an input for clocking flip-flop 30. Since the input to flip-flop 30 is "high" when it is clocked, the output of the flip-flop goes "low" and immediately discharges capacitor 62 through resistor 58 and diode 60. In this connection it is noted that the clock inputs are regulated by zener diodes 20, 24, and 28.

If a continuous undervoltage exists, the output of flip-flop 30 remains "low" and output $E_o$ of comparator amplifier 54 is "high" indicating an undervoltage condition.

Should no undervoltage condition exist, the input to flip-flop 30 will not exceed the threshold of the flip-flop when the clock input is received and the flip-flop will remain in its prior state. That is to say, the output of the flip-flop will remain "high" and will charge capacitor 62 through resistor 64. This renders the output $E_o$ of comparator 54 "low" which indicates the non-undervoltage condition.

Comparator 46 senses an extremely low output voltage from electrical equipment 2, or the complete absence of any output voltage therefrom. When this occurs, capacitor to discharges through comparator 46 whereby output $E_o$ from comparator 54 is maintained in a "high" state.

It will be seen from the foregoing description of the invention that a multi-phase undervoltage detection circuit has been provided which operates accurately over a wide frequency range and is not affected by the frequency of the three-phase input. The device has the advantages of accuracy and simplicity in implementation and thus overcomes the disadvantages of prior art undervoltage detection circuits.

For purposes of illustration, the frequency of the three-phase input voltage may range from 300 to 600 Hz, with the circuit being preset to detect an undervoltage condition of below 100 volts.

With the above description of the invention in mind, reference is to be had to the appended claims for a definition of the scope of the invention.

What is claimed is:

1. A circuit for detecting an undervoltage condition in a multi-phase output from electrical equipment, characterized by:
    means for providing a reference voltage;
    first comparator means connected to the electrical equipment and to the reference voltage means for comparing the peak level of the multi-phase output to the reference voltage and for providing a comparison output;
    means connected to the first comparator means and to the electrical equipment and responsive to the multi-phase output and the comparison output for providing a first output when any of the phase outputs of the multi-phase output are below the reference voltage and for providing a second output when none of the phase outputs are below said reference voltage, said means including switching means having a predetermined threshold and connected to the first comparator means, a clock terminal connected to the electrical equipment and an output terminal, first capacitor means connected to the input terminal of the switching means and to the first comparator means, and charged by the comparison output to a level above the threshold of the switching means when said output is indicative of any of the phase outputs being below the reference voltage, and the switching means being clocked by any other of the phase outputs for providing the first output at its output terminal; and
    second comparator means connected to the first comparator means and to the electrical equipment, and to the reference voltage means, for comparing the first and second outputs to the reference voltage and for providing a third output indicative of the presence of an undervoltage condition in the three-phase output when the first output is provided, and for providing a fourth output indicative of the absence of the undervoltage condition when the second output is provided.

2. A circuit as described by claim 1, wherein the second comparator means is characterized by:
    second capacitor means connected to the output terminal of the switching means and being discharged by the first output therefrom; and
    a comparator connected to the second capacitor means and to the reference voltage means for comparing the output of the discharged second capacitor means and the reference voltage for providing the third output.

3. A circuit as described by claim 3, further characterized by:
    the first capacitor means connected to the input terminal of the switching means and to the first comparator means being charged by the comparison output to a level below the threshold of the switching means when said output is indicative of any of the phase outputs being above the reference voltage;
    the switching means being clocked by any other of the phase outputs for providing the second output at its output terminal;
    the second capacitor means connected to the output terminal of the switching means and being charged by the second output therefrom; and
    the comparator means connected to the second capacitor means and to the reference voltage means for comparing the reference voltage and the output from the charged second capacitor means for providing the fourth output.

4. A circuit as described by claim 2, further characterized by:
    third comparator means connected to the electrical machine and to the reference voltage means for comparing the multi-phase output to the reference voltage and for providing an output when the multi-phase output is substantially absent;

the second capacitor means connected to the third comparator means; and the second capacitor means being responsive to the output of the third comparator means for discharging through said third comparator means, whereby the first capacitor means affects the switching means so that said switching means provides the first output at its output terminal.

* * * * *

UNITED STATES PATENT AND TRADEMARK OFFICE
CERTIFICATE OF CORRECTION

PATENT NO. : 4,507,713
DATED : March 26, 1985
INVENTOR(S) : Samuel C. Hsieh

It is certified that error appears in the above-identified patent and that said Letters Patent are hereby corrected as shown below:

Col. 4, line 44, "claim 3" should read --claim 2--.

Signed and Sealed this

Sixteenth Day of July 1985

[SEAL]

Attest:

DONALD J. QUIGG

*Attesting Officer*   *Acting Commissioner of Patents and Trademarks*